United States Patent
Porzio et al.

(10) Patent No.: US 11,249,830 B1
(45) Date of Patent: Feb. 15, 2022

(54) DETECTING PAGE FAULT TRAFFIC

(71) Applicant: Micron Technology, Inc., Boise, ID (US)

(72) Inventors: Luca Porzio, Casalnuovo (IT); Alessandro Orlando, Milan (IT); Danilo Caraccio, Milan (IT); Roberto Izzi, Caserta (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/993,690

(22) Filed: Aug. 14, 2020

(51) Int. Cl.
*G06F 11/00* (2006.01)
*G06F 11/07* (2006.01)
*G06F 11/30* (2006.01)

(52) U.S. Cl.
CPC .......... *G06F 11/073* (2013.01); *G06F 11/076* (2013.01); *G06F 11/0772* (2013.01); *G06F 11/0781* (2013.01); *G06F 11/3037* (2013.01)

(58) Field of Classification Search
CPC ............... G06F 11/073; G06F 11/0772; G06F 11/3037; G06F 11/076; G06F 11/0781
See application file for complete search history.

(56) References Cited

U.S. PATENT DOCUMENTS

2021/0064274 A1* 3/2021 Lee ................. G06F 3/0614

* cited by examiner

*Primary Examiner* — Matthew M Kim
*Assistant Examiner* — Kyle Emanuele
(74) *Attorney, Agent, or Firm* — Holland & Hart LLP

(57) ABSTRACT

Methods, systems, and devices for detecting page fault traffic are described. A memory device may execute a self-learning algorithm to determine a priority size for read requests, such as a maximum readahead window size or other size related to page faults in a memory system. The memory device may determine the priority size based at least in part on by tracking how many read requests are received for different sizes of sets of data. Once the priority size is determined, the memory device may detect subsequent read requests for sets of data having the priority size, and the memory device may prioritize or other optimize the execution of such read requests.

25 Claims, 6 Drawing Sheets

US 11,249,830 B1

DETECTING PAGE FAULT TRAFFIC

BACKGROUND

The following relates generally to one or more systems for memory and more specifically to detecting page fault traffic.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random-access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
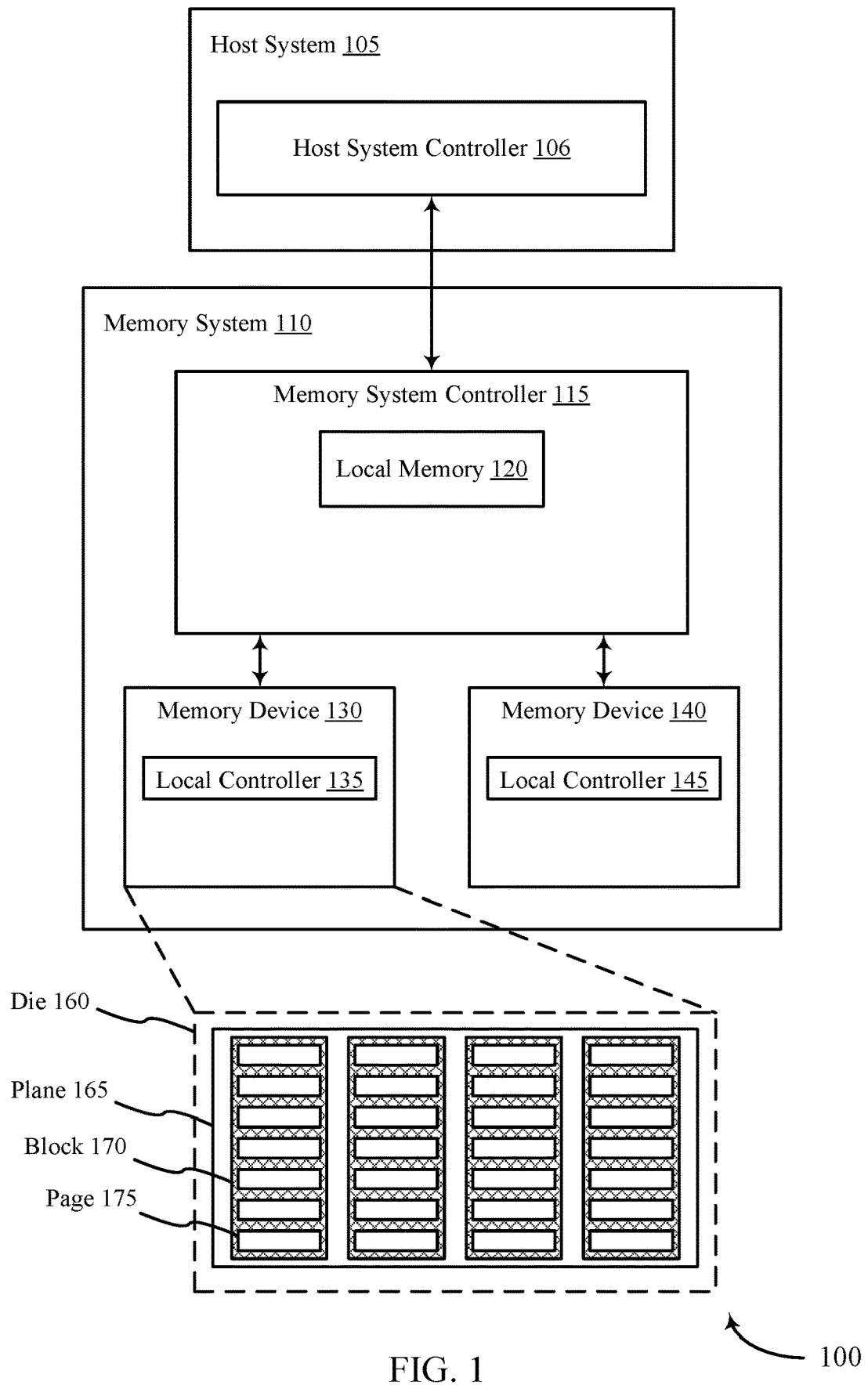
FIG. 1 illustrates an example of a system that supports detecting page fault traffic in accordance with examples as disclosed herein.

A memory system may be used to store data for a host system in an electronic system (e.g., a smart phone, as just one example). The memory system may include one or more memory devices. For example, the memory system may include one or more memory devices with non-volatile memory (e.g., a not-and (NAND) memory device) that may be referred to as storage devices or simply as storage, one or more memory devise that include with volatile memory (e.g., a dynamic random-access memory (DRAM) device) that may be referred to as main memory devices or simply main memory, or both.

The host system may request data from the memory system to execute tasks (e.g., launching an application) by sending read commands to the memory system. For some read commands, the memory system may execute the read commands by outputting data requested by the read command from the main memory device to the host system. In some cases, however, the data requested by the host system may not be stored in main memory (e.g., the data may be stored in storage and not yet loaded into the main memory). Here, the electronic system may experience a page fault, which occurs when the host system attempts to access data that is not yet available from (e.g., stored in) the main memory. When a page fault occurs, the host system may send a read command to copy or otherwise write the requested data from the storage to the main memory. The memory system may output the data to the host system, which in some cases may include outputting the requested data from the main memory once it has been written to the main memory.

In some examples, the latency with which read commands associated with (e.g., triggered by) page faults are executed by the memory system may impact the experience for a user of the electronic system. For example, if a memory system within a smart phone executes page fault read commands with a long latency, the user experience for a user of the smart phone may suffer.

Some electronic systems may implement so-called readahead techniques to decrease a frequency of page faults and thus the impact of latencies in executing associated read requests. For example, when a page fault occurs, the host system may send a read command to the storage that requests a set of data that is larger than the previously requested set of data associated with the page fault. For example, the host system may send a read command to the memory system requesting a first set of data from main memory. In the event of a page fault, the controller of the memory system may send a read command to the storage indicating a second set of data that includes the first set of data plus additional data, and thus is larger than the first set of data. Thus, the storage may output the larger second set of data to the main memory. Writing extra data to the main memory (e.g., data beyond what was previously requested by the host device) may avoid future page faults that may otherwise be associated with subsequent requests for the data that is within the second set of data but not included in the first set of data. Decreasing a rate of page fault occurrence may decrease overall operating latency associated with the memory system and electronic system, thus improving user experience.

In some systems, each read command to the storage may indicate or otherwise be associated with a size, which may refer to a quantity of data requested by the read command, and which in some cases may be referred to as a read length. For example, if the storage is an embedded Multi-Media Controller (eMMC) device, a read command may include or otherwise be associated with a SET_BLOCK_COUNT that may indicate the read length for the read command. As another example, if the storage is a Universal Flash Storage (UFS) device, a read command may include or otherwise be associated with a TRANSFER_LENGTH that may indicate the read length for the read command. In some examples of readahead techniques, read commands in response to page faults (which may be referred to as page fault reads) may each have a same read length, which may be referred to as a maximum readahead window size. In some cases, a read command to storage may not explicitly indicate (e.g., to the storage) whether a read command is a page fault read.

According to aspects described herein, techniques may be used for a storage device to identify a priority size (e.g., priority read length) for read commands and subsequently detect and optimize the execution of read commands that have the priority size. The priority size may be the maximum readahead window size. For example, the storage device may receive plurality of read commands, monitor the read lengths for each read command, and identify the priority size as described in greater detail herein. When the storage device then receives additional read commands, the storage device may detect which additional read commands are associated with the priority size. The storage device may optimize the execution of the read commands that are associated with the priority size. For example, the storage device may prioritize (e.g., temporally) read commands that are associated with the priority size, thus decreasing latency associated with executing those commands. This or other optimizations as described herein may decrease a latency associated with executing read commands that are associated with (e.g., triggered by) a page fault.

Features of the disclosure are initially described in the context of systems and devices as described with reference to FIG. 1. Features of the disclosure are further described in the context of process flow diagrams as described with reference to FIGS. 2 and 3. These and other features of the disclosure are further illustrated by and described with reference to an apparatus diagram and flowcharts that relate to detecting page fault traffic as described with reference to FIGS. 4-6.

FIG. 1 illustrates an example of a system 100 that supports detecting page fault traffic in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a UFS device, an eMMC device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a UFS interface, an eMMC interface, a SATA interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). In some examples, the memory device 130 may be referred to as a storage device (e.g., storage) and memory device 140 may be referred to as a main memory device (e.g., main memory). In some examples, memory system controller 115 may be configured to transfer data and information between the memory device 130 and memory device 140. Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

In some examples, in response to read commands (e.g., requests for data) from the host system 105, the memory system controller 115 may be configured to attempt to read the data from memory device 140, and to read the data from memory device 130 when the data is unavailable from memory device 140. For example, the memory system controller 115 may receive a read command associated with a set of data from the host system 105 and convert the command into appropriate commands to attempt the read the set of data from the memory device 140.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random-access memory (RAM) memory cells, such as DRAM memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random-access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins, greater complexities for supporting circuitry, slower read or write speeds, or any combination thereof.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some examples, the system 100 may experience a page fault. For example, the host system 105 may send a read command to the memory system 110 requesting a set of data from the memory device 140 that, at that time, is not available from (e.g., stored at) the memory device 140 (e.g., the main memory). In some such cases, the host system 105 (e.g., the host system controller 106, which may include or be coupled with a memory management unit (MMU)), may identify a page fault based on the requested set of data not being available from memory device 140. For example, the host system 105 may receive from the memory system controller 115 an indication that the requested set of data is not available from memory device 140. Alternatively, the memory system controller 115 may identify a page fault based on the requested set of data not being available from memory device 140.

Based on (e.g., in response to) identifying the page fault, the host system 105 (or alternatively the memory system controller 115), may initiate a read operation to transfer data from the memory device 140 to the memory device 130, including the set of data associated with the page fault. For example, the memory system controller 115 may send (e.g., in response to receiving a corresponding command from the host system 105), a read command to the memory device 130 to transfer a set of data that includes (e.g., is larger than) the previously requested data associated with the page fault from the memory device 130 to the memory device 140. Requesting, in response to a page fault, that a set of data larger than and including the data associate with the page fault be transferred from the memory device 130 to the memory device 140 may be an example of a readahead technique, and such techniques may be used (e.g., by the host system 105 or the memory system controller 115) to decrease a frequency of page faults. For example, when a page fault occurs, the host system 105 or the memory system controller 115 may initiate a transfer of additional data (e.g., beyond the set of data requested by the host system 105) from the memory device 130 to memory device 140. For example, the host system 105 or the memory system controller 115 may initiate a transfer of data from the memory device 130 to the memory device 140 that has a maximum readahead window size or other priority size.

In some instances, it may not be explicitly indicated to the memory device 130 whether a read command to the memory device 130 is associated with page fault. As described herein, the memory device 130 may utilize techniques to identify a priority size, which may correspond to a maximum readahead size, thus enabling the memory device 130 to identify subsequent read commands having the priority size. For example, during a self-learning phase of operation (e.g., shortly after initializing the memory system 110, such as after a boot or reboot of the system 100), the local controller 135 of memory device 130 may implement techniques (e.g., as described with reference to FIG. 2) to observe received read commands and identify the priority size. For example, the memory device 130 may identify read length that is likely associated with a transfer of data due to a page fault.

During a subsequent detection phase of operation (e.g., after the self-learning phase), the memory device 130 may implement techniques (e.g., methods as described with reference to FIG. 3) to detect which subsequent read commands received from the memory system controller 115 are associated with (e.g., have a read length equal to) the priority size. In some cases, the memory device 130 may optimize (e.g., prioritize) the execution of the read commands having the priority size thus reducing latencies associated with page faults. In some cases, this may decrease a latency associated with the execution of read commands (e.g., read commands associated with page faults) by the memory system 110, thereby improving overall performance of the memory system 110 and the system 100.

The system 100 may include any quantity of non-transitory computer readable media that support detecting page fault traffic. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

Figure 2:
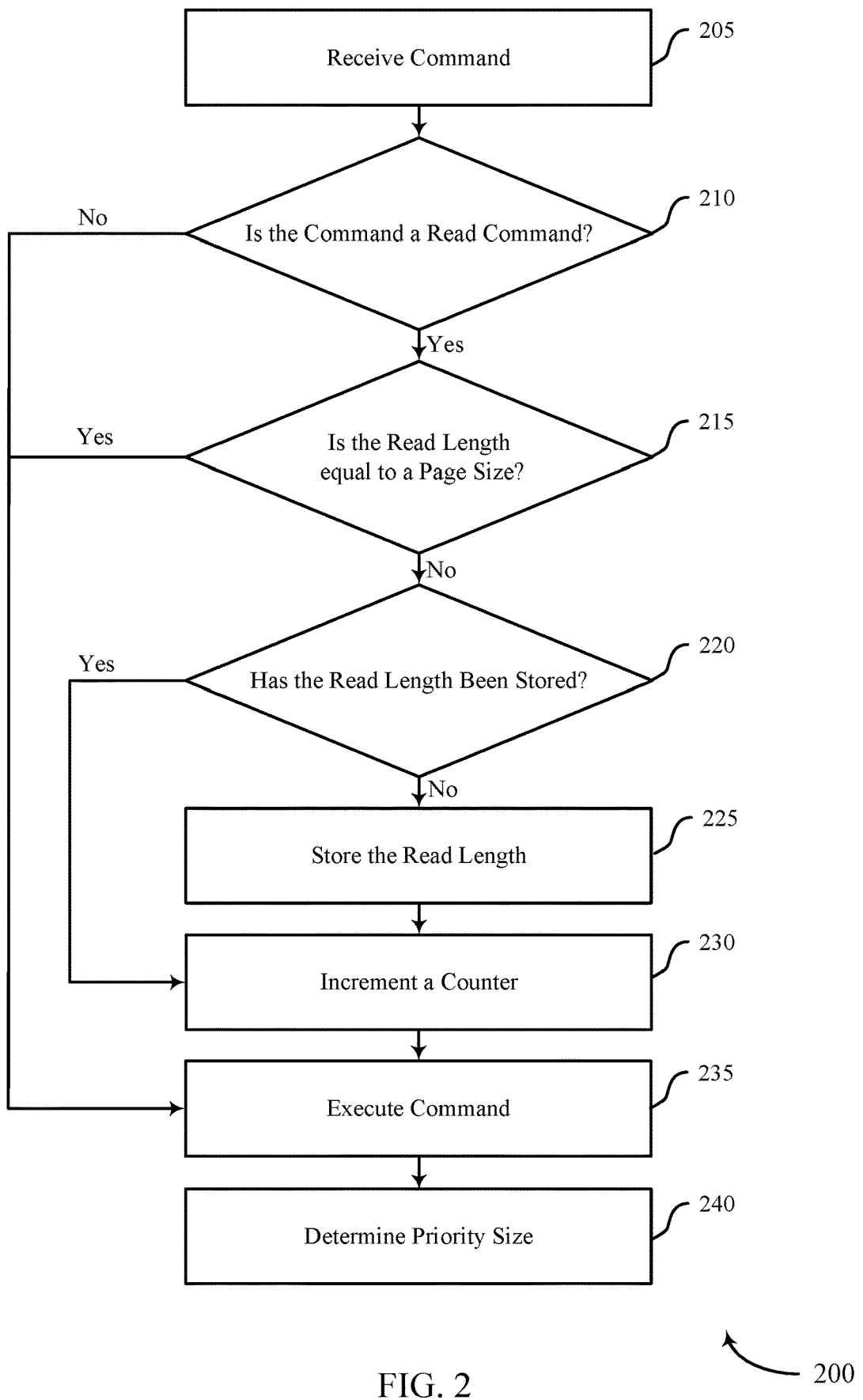
FIG. 2 illustrates an example of a process diagram that supports detecting page fault traffic in accordance with examples as disclosed herein.

FIG. 2 illustrates an example of a process diagram 200 illustrating a method or methods that support techniques for detecting page fault traffic in accordance with examples as disclosed herein. The operations of the process diagram 200 may be implemented by a system or its components as described herein. For example, the operations of process diagram 200 may be performed by a controller (e.g., local controller 135 of FIG. 1) to identify a priority size as described with reference to FIG. 1. Additionally or alternatively, aspects of the process diagram 200 may be implemented as instructions stored in memory (e.g., firmware stored in a memory coupled with the local controller 135). For example, the instructions, when executed by a controller (e.g., the local controller 135), may cause the controller to perform the operations of the process diagram 200. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

In some cases, the operations of process diagram 200 may be performed as part of a self-learning phase of operation. The self-learning phase of operation may occur, for example, upon initialization of a memory system (e.g., a boot or reboot of the memory system, a host system for the memory system, or any combination thereof).

At 205, a command may be received. For example, a memory device (e.g., memory device 130 of FIG. 1) may receive a command from a memory system controller (e.g., a memory system controller 115 of FIG. 1). The command may be received at a local controller (e.g., local controller 135 of FIG. 1). The local controller may receive additional commands, where each additional command may be associated with a different set of data.

At 210, whether the command received at 205 is a read command may be determined. For example, the local controller may identify whether the command received at 205 is a read command. If the local controller determines the command received is a read command, the local controller may proceed to 215. If the local controller determines the command received at 205 is a command type other than a read command (e.g., a write command), the local controller may proceed to 235.

At 215, a read length for the read command may be compared with a page size (e.g., a page size of the operation system (OS) of the host system, or a page size of a main memory device, such as memory device 140). That is, each read command received by the memory device may indicate or otherwise be associated with a read length corresponding to a quantity of data requested by the read command. For example, if the memory device is an eMMC device, a read command may include or otherwise be associated with a SET_BLOCK_COUNT that may indicate the read length for the read command. As another example, if the memory device is a UFS device, a read command may include or otherwise be associated with a TRANSFER_LENGTH that may indicate the read length for the read command. The local controller of the memory device may determine if the read length indicated by or otherwise associated with the read command) is equal to a page size.

For example, a page size for an OS of the host system may be 4 kilobytes (KB). When a host system or memory system controller implements a readahead technique in response to a page fault, the memory device may receive a read command with a read length greater than 4 KB (e.g., 128 KB, 256 KB, or 512 KB). It is to be understood that these and any other numeric values herein are solely for the sake of illustrative clarity and are in no way limiting. Thus, read commands associated with data having a size equal to a page size may not be related to a page fault or other potential priority size (read length for prioritization). If the local controller determines that the read length for the read command received at 205 is equal to the page size, the local controller may proceed to 235. Alternatively, if the local controller determines that the read length for the read command received at 205 is different than (e.g., greater than) the page size, the local controller may proceed to 220.

At 220, whether the read length for the read command received at 205 has been stored (e.g., at the memory device 130 as described with reference to FIG. 1) to a log of read lengths for previously received read commands. For example, the local controller may compare the read length for the read command received at 205 with a set of stored read lengths corresponding to previously received read commands, where the stored read lengths may each be different than the page size. If the local controller determines that the read length for the read command received at 205 is different than any read length previously stored to the log, the local controller may proceed to 225. If the local controller determines that the read length for the read command received at 205 is the same as a read length previously stored to the log, the local controller may proceed to 230.

At 225, if it was determined at 220 that the read length for the read command received at 205 is different than any read length previously stored to the log, the read length for the read command received at 205 may be stored (e.g., added to the log).

At 230, if it was determined at 220 that the read length for the read command received at 205 is the same as a read length previously stored to the log, a counter may be incremented for the read length. For example, the local controller may initiate a counter the first time a read length is stored to the log and then increment the counter each time the local controller receives another read command associated with the same read length. Thus, the counter for a given read length may indicate a quantity of times a read command having the read length has been received from the memory system controller, and the local controller may maintain a respective counter for each read length (e.g., other than the page size). That is, the local counter may initialize a new counter for each received read command having a unique read length and increment a value of a counter when a received read command has the same read length as a previously received read command. After incrementing the value of the counter at 230, the local controller may proceed to 235.

At 235, the command received at 205 may be executed. That is, the local controller may execute the command received from the memory system controller at 205. For example, if the command received at 205 is a write command, the local controller may execute the write command and may store data received from the memory system controller in association with the write command at the memory device. In other example, if the command received at 205 is a read command, the local controller may execute the read command by outputting data from the memory device to the memory system controller.

The process associated with 205 through 235 may be repeated any quantity of times before the local controller proceeds to 240. For example, after executing a threshold quantity of read commands (e.g., one million) or after a predetermined period of time (e.g., twenty-four (24) hours), the local controller may proceed to 240.

At 240, a priority size may be determined. The priority size may, for example, be a maximum readahead size, though it is to be understood that the techniques described herein may be applied to any particular type of read command or associated read length. To determine the priority size, the local controller may multiply each unique read length associated with a set of previously received read commands (e.g., read commands received at an instance of 205) by the respective counter value for the read length (e.g., as incremented at various instances of 230). For example, a first counter associated with a first read length may have a value of ten thousand (10,000). In such an example, the local controller may multiply the first read length by ten thousand (10,000) to generate a first weighted count corresponding to the first read length. The local controller may so generate a respective weighted count for each stored read length (e.g., as stored at various instances of 225). The local controller may then select a maximum weighted count (e.g., the weighted count with the highest value). The local controller may then determine that the read length associated with the highest weighted count is the priority size (e.g., the maximum readahead window size). The local controller thus may determine, for example, which read length other than the page size was associated with the greatest quantity of data output from the storage device to the memory system controller, and may select that read length as the priority size.

Figure 3:
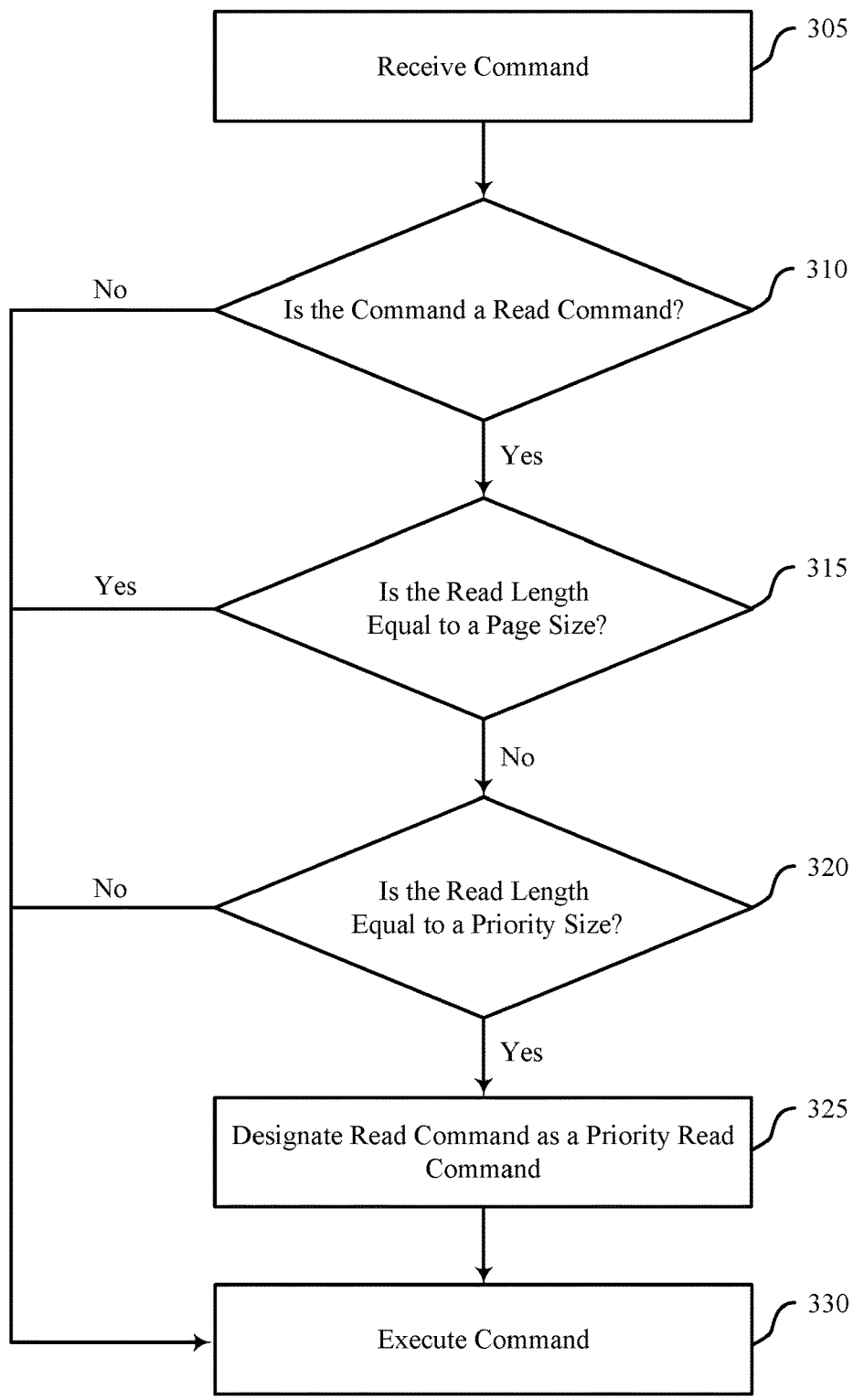
FIG. 3 illustrates an example of a process diagram that supports detecting page fault traffic in accordance with examples as disclosed herein.

FIG. 3 illustrates a process diagram 300 illustrating a method or methods that support techniques for detecting page fault traffic in accordance with examples as disclosed herein. The operations of the process diagram 300 may be implemented by a system or its components as described herein. For example, the operations of process diagram 300 may be performed by a system as described with reference to FIG. 1 (e.g., system 100). Additionally or alternatively, aspects of the process diagram 300 may be implemented as instructions stored in memory (e.g., firmware stored in a memory coupled with the local controller 135). For example, the instructions, when executed by a controller (e.g., the local controller 135), may cause the controller to perform the operations of the process diagram 300. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

In some cases, the operations of process diagram 300 may be performed as part of a detection phase of operation. The detection phase of operation may occur, for example, upon completion of a self-learning phase of operation (e.g., after the determination of a priority size as described with reference to FIG. 2). For example, after a memory device (e.g., memory device 130 of FIG. 1) determines a priority size (e.g., maximum readahead window size), the memory device may implement the methods described herein to detect read commands having the priority size and optimize their execution, which may reduce associated read latencies or otherwise improve the overall performance of a memory system (e.g., memory system 110 of FIG. 1).

At 305, a command may be received. For example, a memory device (e.g., memory device 130 of FIG. 1) may receive a command from a memory system controller (e.g., a memory system controller 115 of FIG. 1). The command may be received at a local controller (e.g., local controller 135 of FIG. 1).

At 310, whether the command received at 305 is a read command may be determined. For example, the local controller may identify whether the command received at 305 is a read command. If the local controller determines the command received at 305 is a read command, the local controller may proceed to 315. If the local controller determines the command received at 305 is of a type other than a read command, the local controller may proceed to 330.

At 315, the read length for the read command received at 305 may be compared with a page size (e.g., a page size of the OS of the host system; a page size of a main memory device, such as memory device 140). If the local controller determines that the read length for the read command received at 305 is the same as the page size, the local controller may proceed to 330. Alternatively, if the local controller determines that read length for the read command received at 305 is different than the page size, the local controller may proceed to 320.

At 320, whether the read length for the read command received at 305 is the same as a priority size (e.g., as determined at 240) may be determined. For example, the local controller may compare the read length for the read command received at 305 with the priority size. If the read length for the read command received at 305 is the same as the priority size, the local controller may proceed to 325. If the read length for the read command received at 305 is different than the priority size, the local controller may proceed to 330 and execute the command.

At 325, based on the read length for the read command received at 305 being determined as equal to the priority size, the read command may be designated (e.g., flagged, marked) or otherwise classified (e.g., categorized for execution purposes) as a priority read command. For example, the local controller may designate or otherwise classify the read command as a priority command. That is, in some cases, the local controller may distinguish the read command received at 305 from other read commands not having the priority size, which may support executing the read command as discussed with reference to 330. Where the priority size corresponds to a maximum readahead window size, designating the read command as a priority read command may correspond to designating the read command as a page fault read.

At 330, the command received at 305 may be executed. For example, the local controller may execute the command received at 305. The local controller may optimize the execution of priority read commands according to one or more techniques, as described herein.

For example, the local controller may prioritize the execution of priority read commands relative to other read commands, such that an order of execution of read commands is based at least in part on whether one or more of the read commands is a priority read command. For example, the local controller may have received a plurality of read commands for execution. In some examples, the local controller may identify a read command of the plurality as a priority read command. In such cases, the local controller may execute the read command identified as the priority read command before executing at least one (e.g., some or all) of the other read commands of the plurality. By expediting execution of priority read commands, the local controller may reduce the read latency associated with executing priority read commands (e.g., page fault reads).

Additionally or alternatively, the local controller may optimize the execution of priority read commands by relocating (or replicating) data associated with priority read commands within the storage device, which may support, for example, reading such data with a reduced latency in the event of a future read command for the data. For example, the local controller may transfer a set of data associated with the read command received at 305 from a first location within the storage device a second location within the storage device. The local controller may also update one or more L2P tables (e.g., as described with reference to FIG. 1) to keep track of data locations as part of such transferring.

In some cases, relocating (or replicating) data associated with a priority read command may include writing the data from memory cells of a first type to memory cells of a second type. For example, as described with reference to FIG. 1, the storage device may be a NAND device. In some examples, the NAND device may include SLC memory cells and multiple-level memory cells (e.g., TLC and QLC memory cells as described with reference to FIG. 1). The multiple-level memory cells memory cells may be configured to be read with a first latency (e.g., so that a read operation thereof may be performed in as first period of time) and the SLC memory cells may be configured to be read with a second latency that is less than the first latency (e.g., so that a read operation thereof may be performed in a second period of time, where the second period of time is less than the first period of time). In such examples, the local controller may transfer the set of data associated with the priority read command from TLC or QLC memory cells to SLC memory cells, which may improve the read latency associated with any subsequent read of such data.

Additionally or alternatively, relocating (or replicating) data associated with a priority read command may include writing the data to a set of contiguous physical locations with the storage (e.g., as part of a subsequent garbage collection procedure), which also may improve the read latency associated with any subsequent read of such data. For example, the storage device (e.g., a NAND memory device) may be configured to perform sequential read operations faster than random read operations. Sequential read operations may refer to read operations used to access a set of data that has been previously stored in the memory device in an easily accessible (or efficient) fashion. For example, sequential read operations may refer to read operations used to access data stored in physically contiguous memory locations. Random read operations may refer to read operations used to access a set of data that has been stored in a less-accessible fashion. For example, random read operations may refer to read operations used to access data stored in physically non-contiguous memory locations. In such examples, the local controller may transfer the set of data associated with the read command identified as a page fault from random (scattered) locations to physically contiguous memory locations to optimize the read latency associated with any future requests for such data.

Figure 4:
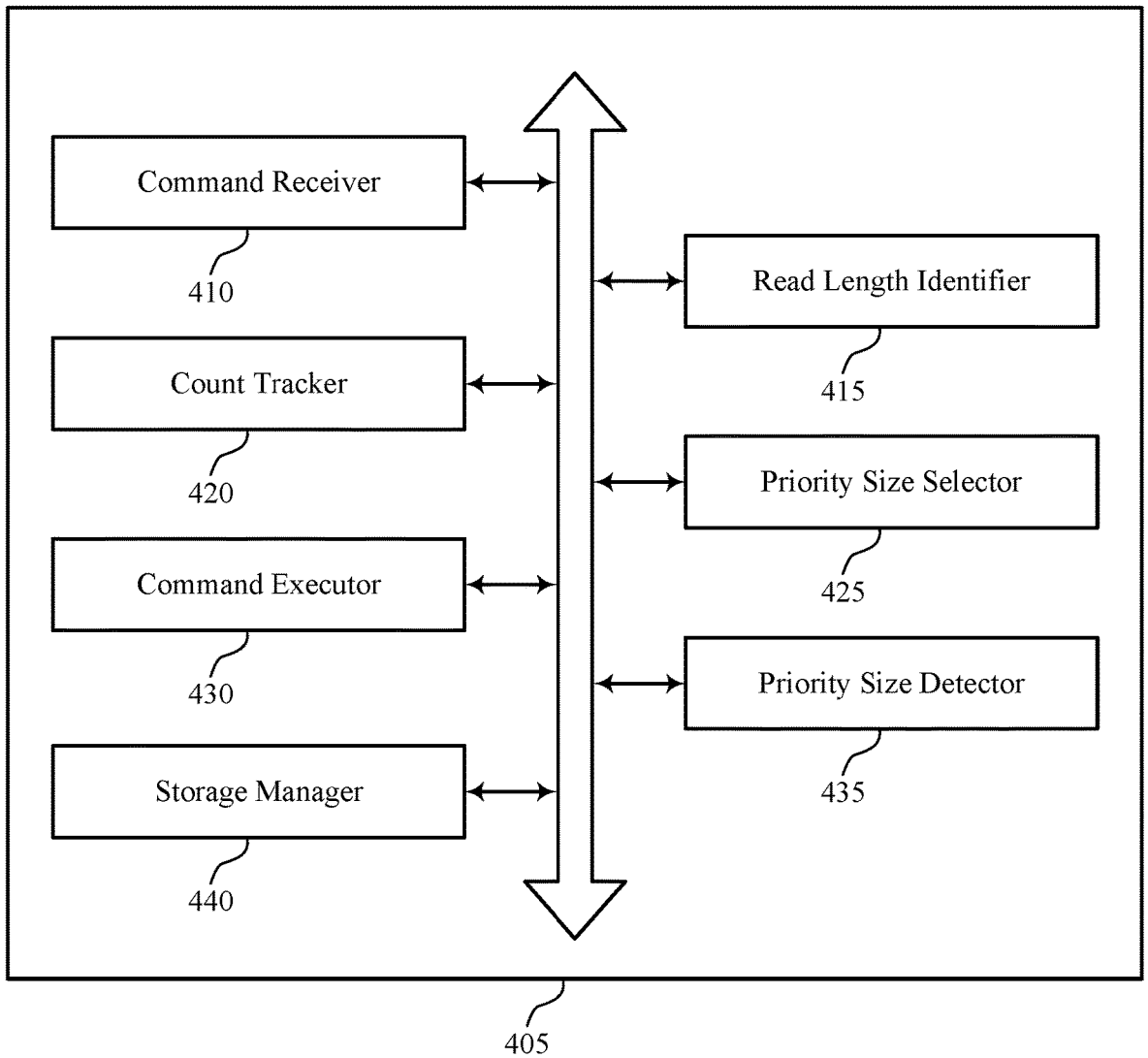
FIG. 4 shows a block diagram of a memory device that supports detecting page fault traffic in accordance with examples as disclosed herein.

FIG. 4 shows a block diagram 400 of a memory device 405 that supports detecting page fault traffic in accordance with examples as disclosed herein. The memory device 405 may be an example of aspects of a memory device as described with reference to FIG. 1. The memory device 405 may include a command receiver 410, a read length identifier 415, a count tracker 420, a priority size selector 425, a command executor 430, a priority size detector 435, and a storage manager 440. In some cases, each of these modules may communicate, directly or indirectly, with one another (e.g., via one or more buses).

The command receiver 410 may receive a first set of read commands each indicating a respective set of data to be read by the memory device, the respective sets of data each having a respective size. In some examples, the command receiver 410 may receive, after a priority size is selected, a second set of read commands indicating respective additional sets of data to be read by the memory device The read length identifier 415 may identify a subset of the respective sizes as each exceeding a threshold size. In some examples, the threshold size may correspond to a size of a page of data associated with the first set of read commands and the second set of read commands. In some instances, the read length identifier 415 may identify that a first read command of the first set of read commands is associated with a first respective size that exceeds the threshold size.

The count tracker 420 may determine, for each size in the subset of the respective sizes, a corresponding count of one or more read commands in the first set of read commands. In some examples, the count tracker 420 may initialize a counter associated with the first respective size based on identifying the first read command associated with the first respective size, where determining the corresponding count of the first respective size is based on initializing the counter. In some cases, the count tracker 420 may identify that a second read command of the first set of read commands is associated with the first respective size. In some instances, the count tracker 420 may increment a value of the counter associated with the first respective size based on identifying the second read command, where determining the corresponding count of the first respective size is based on incrementing the value of the counter.

The count tracker 420 may store a first indication of a first respective size associated with one of the first set of read commands, the first respective size exceeding the threshold size. In some examples, the count tracker 420 may compare a second respective size associated with one of the first set of read commands that exceeds the threshold size with the first respective size based on storing the first indication of the first respective size. In some instances, the count tracker 420 may determine that the second respective size is different than the first respective size based on the comparing. In some examples, the count tracker 420 may store a second indication of the second respective size based on determining that the second respective size is different.

In some cases, the count tracker 420 may compare a third respective size associated with one of the first set of read commands that exceeds the threshold size with the first respective size and the second respective size based on storing the first and second indications. In some examples, the count tracker 420 may determine that the third respective size is the same as the first respective size or the second respective size based on the comparing. In some examples, the count tracker 420 may refrain from storing a third indication of the third respective size based on determining that the third respective size is the same.

The priority size selector 425 may select, from the subset of the respective sizes, a priority size based on the corresponding count for the priority size. In some examples, the priority size selector 425 may select a highest weighted count from the set of weighted counts, where the selected priority size corresponds to the highest weighted count. In some instances, the priority size selector 425 may multiply each size in the subset of respective sizes with the corresponding count to generate a set of weighted counts each associated with a size in the subset of respective sizes, where selecting the priority size is based on multiplying each size.

In some examples, the priority size detector 435 may identify one or more of the additional sets of data as having the priority size. In some cases, the priority size detector 435 may compare a size of each of the additional sets of data indicated by the second set of read commands with the priority size, where identifying the one or more of the additional sets of data as having the priority size is based on the comparing.

The command executor 430 may execute the second set of read commands according to an order that is based on identifying the one or more of the additional sets of data as having the priority size. In some instances, the command executor 430 may execute read commands associated with the one or more additional sets of data having the priority size prior to executing a remaining subset of the second set of read commands, where executing the second set of read commands according to the order is based on executing the subset of the second set of read commands prior to executing the remaining subset of the second set of read commands. In some cases, the command executor 430 may read each of the additional sets of data from the memory device. In some examples, the command executor 430 may transmit each of the additional sets of data to a second memory device.

In some examples, the storage manager 440 may transfer the one or more additional sets of data having the priority size from a first location in the memory device to a second location in the memory device based on identifying the one or more of the additional sets of data as having the priority size. In some examples, the first location in the memory device is configured to be read with a first latency, and the second location is configured to be read with a second latency that is less than the first latency.

In some examples, the memory device comprises NAND memory cells, and the second memory device comprises DRAM memory cells.

In some examples, the priority size corresponds to a maximum readahead window size, the one or more additional sets of data having the priority size each correspond to a respective page fault.

Figure 5:
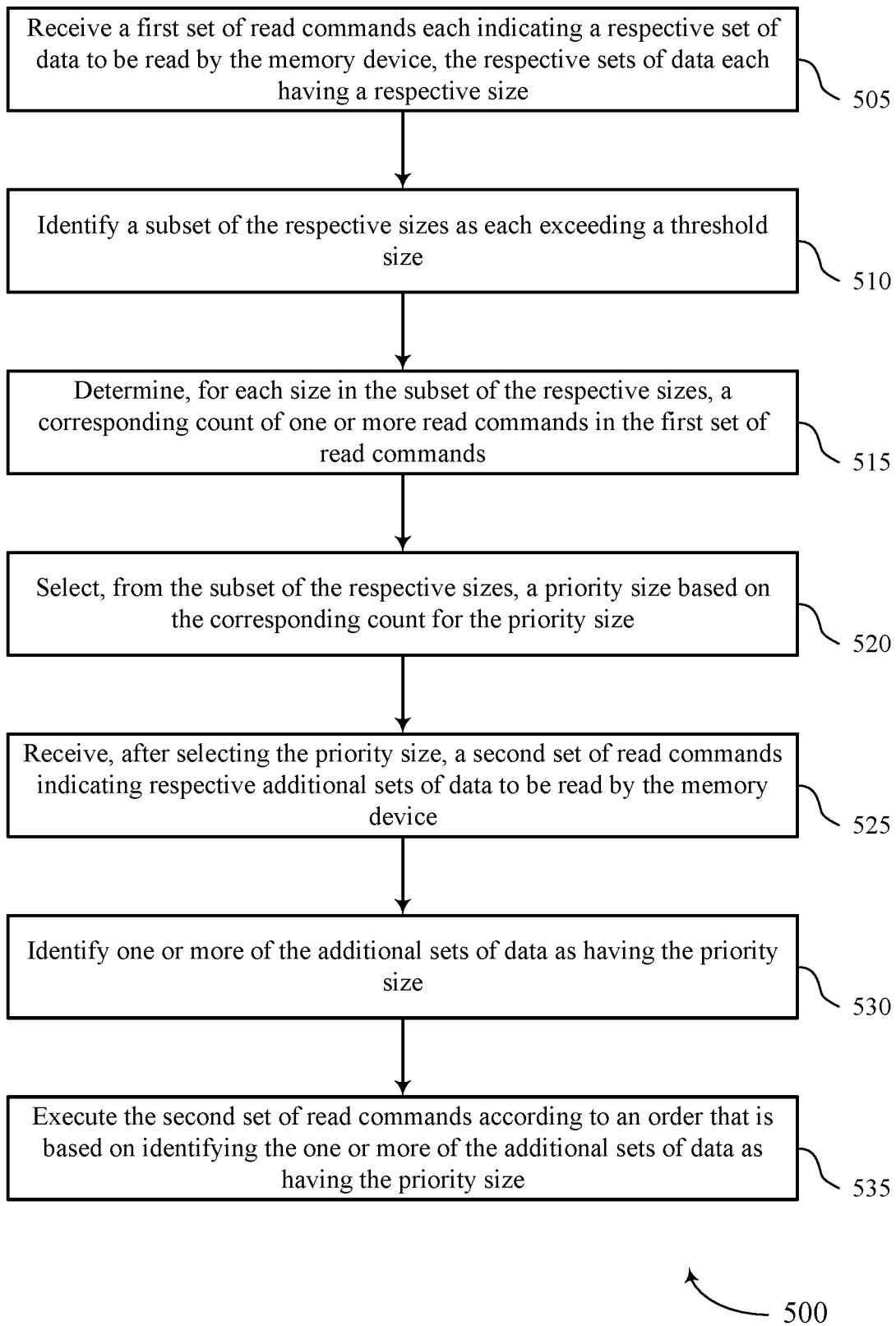
FIGS. 5 and 6 show flowcharts illustrating a method or methods that support detecting page fault traffic in accordance with examples as disclosed herein.

FIG. 5 shows a flowchart illustrating a method or methods 500 that supports detecting page fault traffic in accordance with examples as disclosed herein. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may receive a first set of read commands each indicating a respective set of data to be read by the memory device, the respective sets of data each having a respective size. The operations of 505 may be performed according to the methods described herein. In some examples, aspects of the operations of 505 may be performed by a command receiver as described with reference to FIG. 4.

At 510, the memory device may identify a subset of the respective sizes as each exceeding a threshold size. The operations of 510 may be performed according to the methods described herein. In some examples, aspects of the operations of 510 may be performed by a read length identifier as described with reference to FIG. 4.

At 515, the memory device may determine, for each size in the subset of the respective sizes, a corresponding count of one or more read commands in the first set of read commands. The operations of 515 may be performed according to the methods described herein. In some examples, aspects of the operations of 515 may be performed by a count tracker as described with reference to FIG. 4.

At 520, the memory device may select, from the subset of the respective sizes, a priority size based on the corresponding count for the priority size. The operations of 520 may be performed according to the methods described herein. In some examples, aspects of the operations of 520 may be performed by a priority size identifier as described with reference to FIG. 4.

At 525, the memory device may receive, after selecting the priority size, a second set of read commands indicating respective additional sets of data to be read by the memory device. The operations of 525 may be performed according to the methods described herein. In some examples, aspects of the operations of 525 may be performed by a read length identifier as described with reference to FIG. 4.

At 530, the memory device may identify one or more of the additional sets of data as having the priority size. The operations of 530 may be performed according to the methods described herein. In some examples, aspects of the operations of 530 may be performed by a priority size identifier as described with reference to FIG. 4.

At 535, the memory device may execute the second set of read commands according to an order that is based on identifying the one or more of the additional sets of data as having the priority size. The operations of 535 may be performed according to the methods described herein. In some examples, aspects of the operations of 535 may be performed by a command executor as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving a first set of read commands each indicating a respective set of data to be read by the memory device, the respective sets of data each having a respective size, identifying a subset of the respective sizes as each exceeding a threshold size, determining, for each size in the subset of the respective sizes, a corresponding count of one or more read commands in the first set of read commands, selecting, from the subset of the respective sizes, a priority size based on the corresponding count for the priority size. The apparatus may further include features, means or instructions for, receiving, after selecting the priority size, a second set of read commands indicating respective additional sets of data to be read by the memory device, identifying one or more of the additional sets of data as having the priority size, and executing the second set of read commands according to an order that is based on identifying the one or more of the additional sets of data as having the priority size.

In some examples of the method 500 and the apparatus described herein, operations, features, means, or instructions for selecting the priority size may include operations, features, means, or instructions for multiplying each size in the subset of respective sizes with the corresponding count to generate a set of weighted counts each associated with a size in the subset of respective sizes, and selecting a highest weighted count from the set of weighted counts, where the selected priority size corresponds to the highest weighted count.

In some examples of the method 500 and the apparatus described herein, the threshold size corresponds to a size of a page of data associated with the first set of read commands and the second set of read commands.

Some examples of the method 500 and the apparatus described herein may further include operations, features, means, or instructions for identifying that a first read command of the first set of read commands may be associated with a first respective size that exceeds the threshold size, and initializing a counter associated with the first respective size based on identifying the first read command associated with the first respective size, where determining the corresponding count of the first respective size may be based on initializing the counter.

Some examples of the method 500 and the apparatus described herein may further include operations, features, means, or instructions for identifying that a second read command of the first set of read commands may be associated with the first respective size, and incrementing a value of the counter associated with the first respective size based on identifying the second read command, where determining the corresponding count of the first respective size may be based on incrementing the value of the counter.

Some examples of the method 500 and the apparatus described herein may further include operations, features, means, or instructions for comparing a size of each of the additional sets of data indicated by the second set of read commands with the priority size, where identifying the one or more of the additional sets of data as having the priority size may be based on the comparing.

In some examples of the method 500 and the apparatus described herein, operations, features, means, or instructions for identifying the subset of the respective sizes may include operations, features, means, or instructions for storing a first indication of a first respective size associated with one of the first set of read commands, the first respective size exceeding the threshold size, comparing a second respective size associated with one of the first set of read commands that exceeds the threshold size with the first respective size based on storing the first indication of the first respective size, determining that the second respective size is different than the first respective size based on the comparing, and storing a second indication of the second respective size based on determining that the second respective size is different.

Some examples of the method 500 and the apparatus described herein may further include operations, features, means, or instructions for comparing a third respective size associated with one of the first set of read commands that exceeds the threshold size with the first respective size and the second respective size based on storing the first and second indications, determining that the third respective size may be the same as the first respective size or the second respective size based on the comparing, and refraining from storing a third indication of the third respective size based on determining that the third respective size may be the same.

Some examples of the method 500 and the apparatus described herein may further include operations, features, means, or instructions for transferring the one or more additional sets of data having the priority size from a first location in the memory device to a second location in the memory device based on identifying the one or more of the additional sets of data as having the priority size.

In some examples of the method 500 and the apparatus described herein, the first location in the memory device may be configured to be read with a first latency, and the second location may be configured to be read with a second latency that is less than the first latency.

In some examples of the method 500 and the apparatus described herein, operations, features, means, or instructions for executing the second set of read commands may include operations, features, means, or instructions for executing read commands associated with the one or more additional sets of data having the priority size prior to executing a remaining subset of the second set of read commands.

In some examples of the method 500 and the apparatus described herein, operations, features, means, or instructions for executing the second set of read commands may include operations, features, means, or instructions for reading each of the additional sets of data from the memory device, and transmitting each of the additional sets of data to a second memory device.

In some examples of the method 500 and the apparatus described herein, the memory device comprises NAND memory cells, and the second memory device comprises DRAM memory cells.

In some examples of the method 500 and the apparatus described herein, the priority size corresponds to a maximum readahead window size, and the one or more additional sets of data having the priority size each correspond to a respective page fault.

Figure 6:
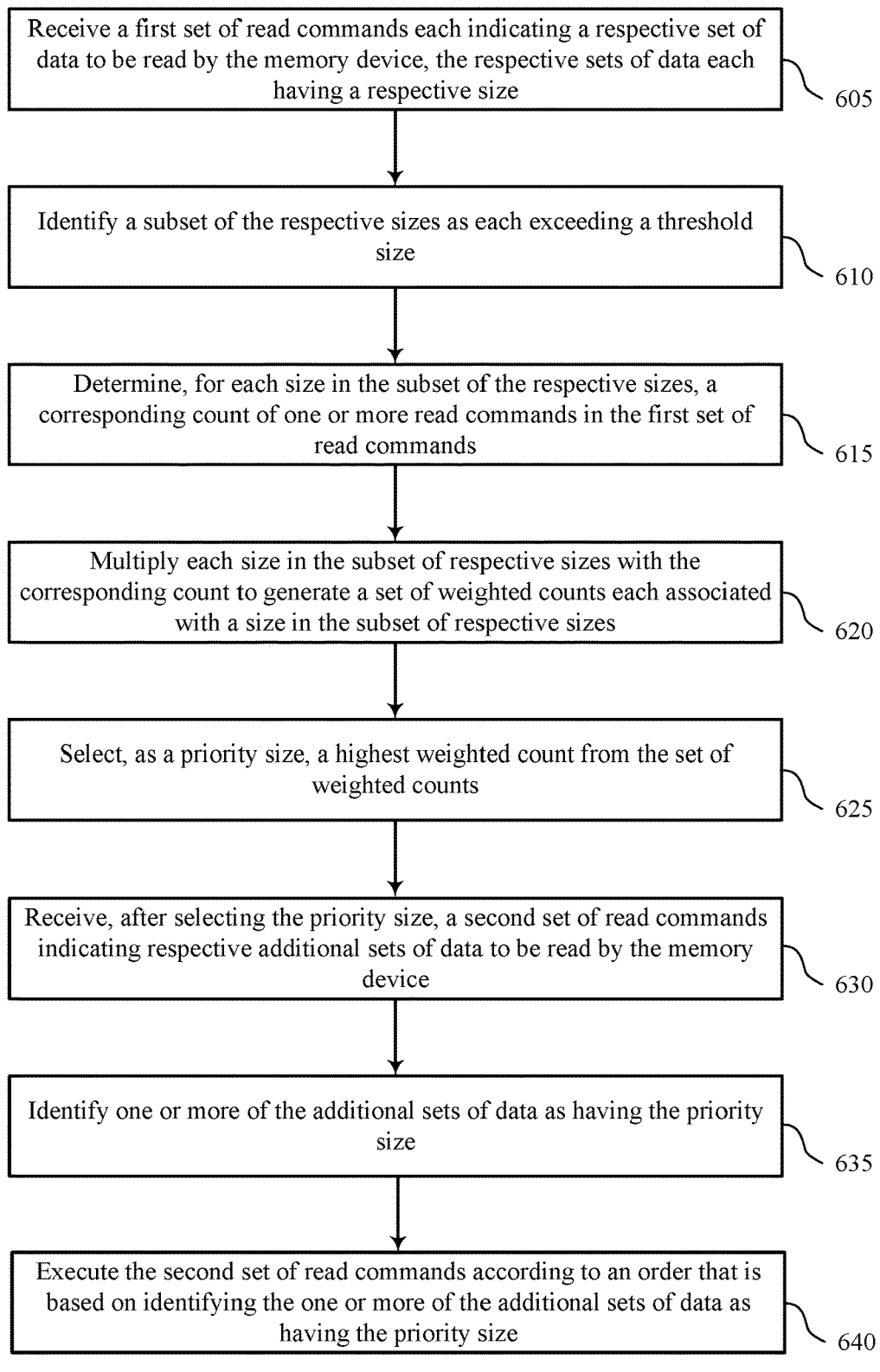

FIG. 6 shows a flowchart illustrating a method or methods 600 that supports detecting page fault traffic in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may receive a first set of read commands each indicating a respective set of data to be read by the memory device, the respective sets of data each having a respective size. The operations of 605 may be performed according to the methods described herein. In some examples, aspects of the operations of 605 may be performed by a command receiver as described with reference to FIG. 4.

At 610, the memory device may identify a subset of the respective sizes as each exceeding a threshold size. The operations of 610 may be performed according to the methods described herein. In some examples, aspects of the operations of 610 may be performed by a read length identifier as described with reference to FIG. 4.

At 615, the memory device may determine, for each size in the subset of the respective sizes, a corresponding count of one or more read commands in the first set of read commands. The operations of 615 may be performed according to the methods described herein. In some examples, aspects of the operations of 615 may be performed by a count tracker as described with reference to FIG. 4.

At 620, the memory device may multiply each size in the subset of respective sizes with the corresponding count to generate a set of weighted counts each associated with a size in the subset of respective sizes. The operations of 620 may be performed according to the methods described herein. In some examples, aspects of the operations of 620 may be performed by a priority size identifier as described with reference to FIG. 4.

At 625, the memory device may select, as a priority size, a highest weighted count from the set of weighted counts.

The operations of 625 may be performed according to the methods described herein. In some examples, aspects of the operations of 625 may be performed by a read length identifier as described with reference to FIG. 4.

At 630, the memory device may receive, after selecting the priority size, a second set of read commands indicating respective additional sets of data to be read by the memory device. The operations of 630 may be performed according to the methods described herein. In some examples, aspects of the operations of 630 may be performed by a read length identifier as described with reference to FIG. 4.

At 635, the memory device may identify one or more of the additional sets of data as having the priority size. The operations of 635 may be performed according to the methods described herein. In some examples, aspects of the operations of 635 may be performed by a priority size identifier as described with reference to FIG. 4.

At 640, the memory device may execute the second set of read commands according to an order that is based on identifying the one or more of the additional sets of data as having the priority size. The operations of 640 may be performed according to the methods described herein. In some examples, aspects of the operations of 640 may be performed by a command executor as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving a first set of read commands each indicating a respective set of data to be read by the memory device, the respective sets of data each having a respective size, identifying a subset of the respective sizes as each exceeding a threshold size, determining, for each size in the subset of the respective sizes, a corresponding count of one or more read commands in the first set of read commands, multiplying each size in the subset of respective sizes with the corresponding count to generate a set of weighted counts each associated with a size in the subset of respective sizes, and selecting, as a priority size, a highest weighted count from the set of weighted counts. The apparatus may further include features, means or instructions for, receiving, after selecting the priority size, a second set of read commands indicating respective additional sets of data to be read by the memory device, identifying one or more of the additional sets of data as having the priority size, and executing the second set of read commands according to an order that is based on identifying the one or more of the additional sets of data as having the priority size.

It should be noted that the methods described herein are possible implementations, and that the operations and the steps may be rearranged or otherwise modified and that other implementations are possible. Furthermore, portions from two or more of the methods may be combined.

An apparatus (e.g., a system) is described. The apparatus may include a first memory device including volatile memory cells, a second memory device including non-volatile memory cells, and a controller coupled with the first memory device and the second memory device. The controller may be configured to transmit, to the second memory device, a first set of read commands, the first set of read commands each indicating a respective set of data to be read by the second memory device and the respective sets of data each having a respective size, and transmit, to the second memory device, a second set of read commands indicating respective additional sets of data to be read by the second memory device. The second memory device may be configured to identify a subset of the respective sizes associated with the first set of read commands as each exceeding a threshold size, determine, for each size in the subset of the respective sizes, a corresponding count of one or more read commands in the first set of read commands, select, from the subset of the respective sizes, a priority size based on the corresponding count for the priority size, identify one or more of the additional sets of data associated with the second set of read commands as having the priority size, and execute the second set of read commands according to an order that is based on identifying the one or more of the additional sets of data as having the priority size.

In some examples, the controller may be further configured to transmit, to the second memory device, a read command within the second set of read commands indicating a set of data having a size associated with a maximum readahead window size, and the second memory device may be further configured to compare the size of the set of data indicated by the read command to the priority size, and identify the read command as having the priority size based at least in part on the comparing, wherein executing the second set of read commands according to the order is based at least in part on identifying the read command as having the priority size.

In some examples, the second memory device may be further configured to multiply each size in the subset of respective sizes with the corresponding count to generate a set of weighted counts each associated with a size in the subset of respective sizes, and select a highest weighted count from the set of weighted counts, where the priority size corresponds to the highest weighted count.

In some examples, the volatile memory cells may be DRAM memory cells, the non-volatile memory cells may be NAND memory cells, and the threshold size may correspond to a size of a page of data associated with the first set of read commands and the second set of read commands.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory device;
    a controller coupled with the memory device and configured to cause the apparatus to:
        receive a first set of read commands each indicating a respective set of data to be read by the memory device, the respective sets of data each having a respective size;
        identify a subset of the respective sizes as each exceeding a threshold size;
        determine, for each size in the subset of the respective sizes, a corresponding count of one or more read commands in the first set of read commands;
        select, from the subset of the respective sizes, a priority size based at least in part on the corresponding count for the priority size;
        receive, after selecting the priority size, a second set of read commands indicating respective additional sets of data to be read by the memory device;
        identify one or more of the additional sets of data as having the priority size; and
        execute the second set of read commands according to an order that is based at least in part on identifying the one or more of the additional sets of data as having the priority size.

2. The apparatus of claim 1, wherein, to select the priority size, the controller is configured to cause the apparatus to:
    multiply each size in the subset of respective sizes with the corresponding count to generate a plurality of weighted counts each associated with a size in the subset of respective sizes; and
    select a highest weighted count from the plurality of weighted counts, wherein the priority size corresponds to the highest weighted count.

3. The apparatus of claim 1, wherein the threshold size corresponds to a size of a page of data associated with the first set of read commands and the second set of read commands.

4. The apparatus of claim 1, wherein the controller is further configured to cause the apparatus to:
    identify that a first read command of the first set of read commands is associated with a first respective size that exceeds the threshold size; and
    initialize a counter associated with the first respective size based at least in part on identifying the first read command associated with the first respective size, wherein determining the corresponding count of the first respective size is based at least in part on initializing the counter.

5. The apparatus of claim 4, wherein the controller is further configured to cause the apparatus to:
    identify that a second read command of the first set of read commands is associated with the first respective size; and
    increment a value of the counter associated with the first respective size based at least in part on identifying the second read command, wherein determining the corresponding count of the first respective size is based at least in part on incrementing the value of the counter.

6. The apparatus of claim 1, wherein, to identify the one or more of the additional sets of data as having the priority size, the controller is configured to cause the apparatus to:
    compare a size of each of the additional sets of data indicated by the second set of read commands with the priority size.

7. The apparatus of claim 1, wherein, to identify the subset of the respective sizes, the controller is configured to cause the apparatus to:
    store a first indication of a first respective size associated with one of the first set of read commands, the first respective size exceeding the threshold size;
    compare a second respective size associated with one of the first set of read commands that exceeds the threshold size with the first respective size based at least in part on storing the first indication of the first respective size;
    determine that the second respective size is different than the first respective size based at least in part on the comparing; and
    store a second indication of the second respective size based at least in part on determining that the second respective size is different.

8. The apparatus of claim 7, wherein the controller is further configured to cause the apparatus to:
    compare a third respective size associated with one of the first set of read commands that exceeds the threshold size with the first respective size and the second respective size based at least in part on storing the first and second indications;
    determine that the third respective size is the same as the first respective size or the second respective size based at least in part on the comparing; and
    refrain from storing a third indication of the third respective size based at least in part on determining that the third respective size is the same.

9. The apparatus of claim 1, wherein the controller is further configured to cause the apparatus to:
  transfer the one or more additional sets of data having the priority size from a first location in the memory device to a second location in the memory device based at least in part on identifying the one or more of the additional sets of data as having the priority size.

10. The apparatus of claim 9, wherein:
  the first location in the memory device is configured to be read with a first latency; and
  the second location is configured to be read with a second latency that is less than the first latency.

11. The apparatus of claim 1, wherein, to execute the second set of read commands according to the order, the controller is configured to cause the apparatus to:
  execute read commands associated with the one or more additional sets of data having the priority size prior to executing a remaining subset of the second set of read commands.

12. The apparatus of claim 1, wherein, to execute the second set of read commands, the controller is configured to cause the apparatus to:
  read each of the additional sets of data from the memory device; and
  transmit each of the additional sets of data to a second memory device.

13. The apparatus of claim 12, wherein:
  the memory device comprises NAND memory cells; and
  the second memory device comprises dynamic random-access memory (DRAM) memory cells.

14. The apparatus of claim 1, wherein:
  the priority size corresponds to a maximum readahead window size; and
  the one or more additional sets of data having the priority size each correspond to a respective page fault.

15. A memory system, comprising:
  a first memory device comprising volatile memory cells;
  a second memory device comprising non-volatile memory cells; and
  a controller coupled with the first memory device and the second memory device, wherein the controller is configured to:
    transmit, to the second memory device, a first set of read commands, the first set of read commands each indicating a respective set of data to be read by the second memory device and the respective sets of data each having a respective size; and
    transmit, to the second memory device, a second set of read commands indicating respective additional sets of data to be read by the second memory device; and
  wherein the second memory device is configured to:
    identify a subset of the respective sizes associated with the first set of read commands as each exceeding a threshold size;
    determine, for each size in the subset of the respective sizes, a corresponding count of one or more read commands in the first set of read commands;
    select, from the subset of the respective sizes, a priority size based at least in part on the corresponding count for the priority size;
    identify one or more of the additional sets of data associated with the second set of read commands as having the priority size; and
    execute the second set of read commands according to an order that is based at least in part on identifying the one or more of the additional sets of data as having the priority size.

16. The memory system of claim 15, wherein:
  the controller is further configured to transmit, to the second memory device, a read command within the second set of read commands indicating a set of data having a size associated with a maximum readahead window size; and
  the second memory device is further configured to:
    compare the size of the set of data indicated by the read command to the priority size; and
    identify the read command as having the priority size based at least in part on the comparing, wherein executing the second set of read commands according to the order is based at least in part on identifying the read command as having the priority size.

17. The memory system of claim 15, wherein the second memory device is further configured to:
  multiply each size in the subset of respective sizes with the corresponding count to generate a plurality of weighted counts each associated with a size in the subset of respective sizes; and
  select a highest weighted count from the plurality of weighted counts, wherein the priority size corresponds to the highest weighted count.

18. The memory system of claim 15, wherein:
  the volatile memory cells comprise dynamic random-access memory (DRAM) memory cells;
  the non-volatile memory cells comprise NAND memory cells; and
  the threshold size corresponds to a size of a page of data associated with the first set of read commands and the second set of read commands.

19. A non-transitory computer-readable medium storing code comprising instructions, which when executed by a processor of an electronic system, cause the electronic system to:
  receive a first set of read commands each indicating a respective set of data to be read by the electronic system, the respective sets of data each having a respective size;
  identify a subset of the respective sizes as each exceeding a threshold size;
  determine, for each size in the subset of the respective sizes, a corresponding count of one or more read commands in the first set of read commands;
  select, from the subset of the respective sizes, a priority size based at least in part on the corresponding count for the priority size;
  receive, after selecting the priority size, a second set of read commands indicating respective additional sets of data to be read by the electronic system;
  identify one or more of the additional sets of data as having the priority size; and
  execute the second set of read commands according to an order that is based at least in part on identifying the one or more of the additional sets of data as having the priority size.

20. The non-transitory computer-readable medium of claim 19, wherein, to select the priority size, the instructions, when executed by the processor of the electronic system, further cause the electronic system to:
  multiply each size in the subset of respective sizes with the corresponding count to generate a plurality of weighted counts each associated with a size in the subset of respective sizes; and
  select a highest weighted count from the plurality of weighted counts, wherein the priority size corresponds to the highest weighted count.

21. The non-transitory computer-readable medium of claim 19, wherein the threshold size corresponds to a size of a page of data associated with the first set of read commands and the second set of read commands.

22. The non-transitory computer-readable medium of claim 19, wherein the instructions, when executed by the processor of the electronic system, further cause the electronic system to:
   identify that a first read command of the first set of read commands is associated with a first respective size that exceeds the threshold size; and
   initialize a counter associated with the first respective size based at least in part on identifying the first read command associated with the first respective size, wherein determining the corresponding count of the first respective size is based at least in part on initializing the counter.

23. The non-transitory computer-readable medium of claim 22, wherein the instructions, when executed by the processor of the electronic system, further cause the electronic system to:
   identify that a second read command of the first set of read commands is associated with the first respective size; and
   increment a value of the counter associated with the first respective size based at least in part on identifying the second read command, wherein determining the corresponding count of the first respective size is based at least in part on incrementing the value of the counter.

24. The non-transitory computer-readable medium of claim 19, wherein, to identify the one or more additional sets of data as having the priority size, the instructions, when executed by the processor of the electronic system, further cause the electronic system to:
   compare a size of each of the additional sets of data indicated by the second set of read commands with the priority size.

25. The non-transitory computer-readable medium of claim 19, wherein the instructions, when executed by the processor of the electronic system, further cause the electronic system to:
   transfer the one or more additional sets of data having the priority size from a first location in the electronic system to a second location in the electronic system based at least in part on identifying the one or more of the additional sets of data as having the priority size.

* * * * *